United States Patent [19]

Mandrin

[11] 4,414,195
[45] * Nov. 8, 1983

[54] METHOD FOR THE PREPARATION OF DEUTERIUM-ENRICHED WATER

[75] Inventor: Charles Mandrin, Winterthur, Switzerland

[73] Assignee: Sulzer Brothers Limited, Winterthur, Switzerland

[*] Notice: The portion of the term of this patent subsequent to Aug. 4, 1998 has been disclaimed.

[21] Appl. No.: 290,097

[22] Filed: Aug. 4, 1981

[30] Foreign Application Priority Data

Sep. 1, 1980 [CH] Switzerland ............. 6571/80

[51] Int. Cl.³ ............................................. C01B 5/00
[52] U.S. Cl. ..................................... 423/580; 423/648 A
[58] Field of Search ........... 423/580 R, 580 H, 648 A

[56] References Cited

U.S. PATENT DOCUMENTS

4,123,508  10/1978  Mandrin ........................ 422/211
4,264,567  4/1981  Pinto ........................ 252/373

FOREIGN PATENT DOCUMENTS

2542705  3/1977  Fed. Rep. of Germany ... 423/648 A
2637811  4/1977  Fed. Rep. of Germany ... 423/648 A
55-51702  4/1980  Japan ............... 423/648 A Primary Examiner—Herbert T. Carter
Assistant Examiner—Wayne A. Langel
Attorney, Agent, or Firm—Kenyon & Kenyon

[57] ABSTRACT

Hydrogen is produced in a synthesis gas plant which is subdivided into several units. The units are operated in such a way that concentrated water is separated from the effluent leaving the first unit in a condenser and supplied to the next stage as feed water. The steam produced in the last unit which is most strongly enriched with deuterium relative to the first unit is separated in a condenser and the deuterium-enriched water is introduced into a tank from which the water is supplied to a heavy water production plant as a starting material.

8 Claims, 1 Drawing Figure

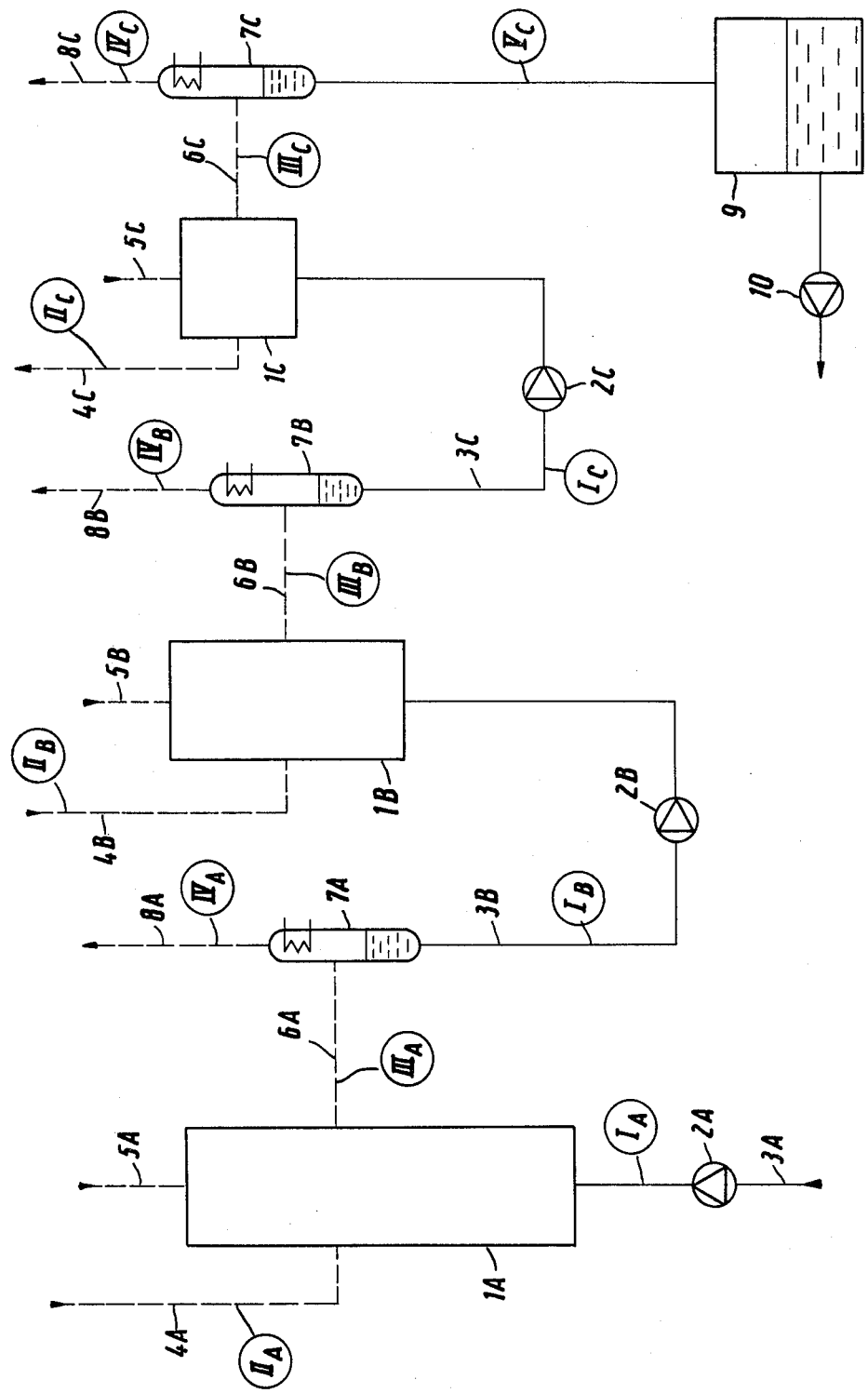

METHOD FOR THE PREPARATION OF DEUTERIUM-ENRICHED WATER

This invention relates to a method for the preparation of deuterium-enriched water.

Heretofore, various methods have been known for producing deuterium-enriched water. For example, as described in U.S. Pat. No. 4,123,508, a hydrogen-producing process which obtains hydrogen by catalytic and/or thermal separation can be used to obtain deuterium-enriched water.

Generally, in these hydrogen-producing processes, for example for making ammonia or methanol in a synthesis gas plant, considerable through-put quantities of hydrogen, water and steam are present. Thus, it is possible to obtain deuterium-enriched water as a by-product and to use the obtained water as a starting material in a plant of conventional construction for the production of heavy water.

It is also known that the higher the deuterium concentration of the starting material is, the more economically efficient relative to the cost of energy and instrumentation is the plant for producing heavy water. Further, it is known that in the usual catalytic and/or thermal methods for producing hydrogen, deuterium enrichment of steam occurs at the expense of a deuterium depletion of hydrogen. Canadian Pat. No. 963,634, for example, described and illustrates in detail one such conventional hydrogen preparation facility.

In known process of obtaining a deuterium-enriched water, a mixture leaving the hydrogen production plant is separated into gaseous and liquid components. The resulting condensate, containing deuterium, is then isolated and returned into the charge of the production plant with the deuterium contained in the condensate being transferred by isotope exchange in counter-current to a partial stream of fresh steam, the partial stream of steam is then returned with the deuterium into the charge of the production plant. This process is carried out so that the hydrogen obtained in a thermal and catalytic plant leaves the plant with a natural deuterium concentration. Then, for the purpose of producing heavy water, deuterium is to be extracted in a manner known per se from the synthesis gas, which in the given example is discharged from the plant before the synthesis gas is processed to ammonia in a synthesis plant.

If the known plant were modified so that instead of extracting deuterium from the synthesis gas, the condensed waste water leaving the hydrogen production plant were used as the starting material for a heavy water production plant, then the deuterium concentration would indeed be higher than the natural deuterium concentration of the hydrogen, but not higher than about 200 parts per million (ppm)

$$\left(\frac{D}{D+H}\right).$$

In the process known from U.S. Pat. No. 4,123,508, it is indeed possible to produce a starting material for the heavy water production plant which has a somewhat higher deuterium concentration, i.e., 333 ppm $$\left(\frac{D}{D+H}\right)$$

in the given example. This, however, can be achieved only if certain steps are performed. For example, the steam fed into the hydrogen production plant must be enriched beyond the natural deuterium concentration by bringing the steam into isotope exchange with a water stream enriched with deuterium composed of a first partial stream of water taken from a condenser connected after the hydrogen producer and a second partial stream originating from an additional water source and enriched with deuterium during the process (the deuterium concentration of which is between the natural deuterium concentration and that of the first partial stream). Further, the gas mixture of hydrogen, steam and residual components from the condenser must be introduced into at least one exchange stage in which, in a separation stage in the presence of a catalyst, the steam becomes enriched with deuterium, by isotope exchange between the hydrogen and the steam of the mixture. Still further, the water taken from the additional water source must be brought in contact with the mixture in an exchange column, the water becoming enriched with deuterium by isotope exchange with the steam. Also, the mixture stream, which after condensing of any steam remaining therein consists essentially of hydrogen, must be drawn out of the plant, and the deuterium-enriched water removed from the condenser connected after the hydrogen producer.

Such a plant, therefore, requires an additional synthesis gas-water exchange plant for achieving the desired deuterium enrichment of the starting material for the heavy water production plant.

Accordingly, it is an object of the invention to make possible a deuterium enrichment of the condensed waste water component serving as a starting material for a plant for the production of heavy water in a more economical manner, i.e. without requiring additional equipment.

It is another object of the invention to obtain deuterium-enriched water of high deuterium concentration.

It is another object of the invention to provide a method of obtaining a highly deuterium-enriched water which can use relatively simple and inexpensive equipment.

Briefly, the invention provides a method for the preparation of deuterium-enriched water which can be carried out in an otherwise conventional process for obtaining heavy water. In accordance with the invention, a carbonaceous feedstock selected from the group consisting of at least carbon and/or one or more hydrocarbons is supplied with water or steam in excess to a first unit of a hydrogen production plant having at least two separating units for obtaining synthesis gas. Thereafter, an effluent from this first unit is separated into a gaseous component and a liquid component consisting of a deuterium-enriched waste water. The liquid component is then isolated, introduced into a second unit of the plant, and contacted with a smaller quantity of carbon or hydrocarbon(s) than in the first unit. The resulting effluent from the second unit is then separated into a liquid component consisting of a deuterium-enriched waste water and a gaseous component. Next, this liquid component is supplied to a plant for the production of heavy water.

By carrying out the production of deuterium-enriched water in several units, the waste water condensed out of the mixture leaving a unit shows a continuously increasing higher deuterium concentration as compared with the water or steam fed into the unit.

The water fed into the first unit can be from a natural water source, as for example, river, sea, or lake water, which, as is known, has a deuterium concentration in the order of about 130 to 160 parts per million (ppm)

$$\left(\frac{D}{D+H}\right).$$

The quantity of waste water decreases from stage to unit so that, in terms of apparatus, each following unit is made much smaller than the preceding and also requires correspondingly less energy. Here, the fact is utilized that the catalytic and/or thermal plants used for the production of hydrogen require, for reasons of chemical equilibrium conditions during the occurring reactions, an excess of water or steam to be supplied. The ratio of the quantity of water fed into the plant to the quantity of waste water leaving the plant or the individual units depends on the kind of process occurring in the hydrogen production and, in particular, on the kind of fuel supplied.

Depending on the number of units, a correspondingly high deuterium enrichment of the waste water, which is supplied as a starting material to a heavy water production plant, is obtained.

Advantageously, the waste water leaving the last stage can be stored for a given time in a storage tank prior to being supplied to the plant for the production of heavy water. In this case, the heavy water production plant can be operated continuously even in case of brief interruptions of the hydrogen production plant, e.g., due to current failure. The size of the storage tank will depend on the desired uninterrupted operating period of the heavy water production plant.

Naturally, before the first start-up of the heavy water production plant, the storage tank must be filled with the desired quantity of enriched water; being filled during a corresponding period from the hydrogen production plant before the heavy water production plant is placed in operation, or being filled with appropriately enriched water taken from an outside source.

These and other objects and advantages of the invention will become more apparent from the following detailed description taken in conjunction with the accompanying drawing in which:

The drawing illustrates a flow diagram of a hydrogen production plant constructed in accordance with the invention with three units and coupled with a system for the production of heavy water.

In the given example, a synthesis gas mixture consisting of hydrogen and nitrogen is to be produced, which serves for the production of ammonia in a synthesis gas plant (not shown).

For the production of hydrogen, the hydrogen production plant is provided with three hydrogen production units in the form of catalytic plants 1A, 1B and 1C connected one behind the other with respect to the supply of feed water and removal of a mixture consisting essentially of hydrogen, nitrogen and steam. The various units involve known forms of construction customary in the practice and, therefore, are indicated only schematically. Each unit consists essentially of a primary reformer containing a catalyst, e.g. nickel oxide, to which heated high-pressure steam and hydrocarbon, e.g. methane ($CH_4$), is supplied, a so-called secondary reformer into which air is fed, and a converter in which a chemical reaction takes place which is expressed by the formula:

$$CO + H_2O \rightarrow CO_2 + H_2.$$

As indicated, fresh water, e.g. river water, is fed into the first unit 1A by means of a pump 2A through a line 3A and is evaporated in the unit 1A in a manner not shown. In addition, a hydrocarbon, i.e. methane, is introduced through a line 4A at the required operating pressure, and a corresponding quantity of air is introduced through a line 5A into the stage 1A.

The effluent leaving the unit 1A is a mixture, as is known, consisting essentially of hydrogen, steam, carbon dioxide, and nitrogen, and is introduced through a line 6A into a condenser 7A, wherein the mixture is separated into a gaseous component and a liquid component consisting of deuterium-enriched water.

The gaseous component consisting essentially of hydrogen, nitrogen, carbon dioxide and still containing traces of steam is introduced via a line 8A—after carbon dioxide and methane have been separated out in known manner—into an ammonia synthesis plant (not shown).

The deuterium-enriched water, whose quantity is considerably smaller, for reasons mentioned above, than the quantity of fresh water fed into plant 1A, is isolated and introduced through a line 3B by means of a pump 2B into the second unit 1B. The deuterium-enriched water is then brought in contact with methane or respectively air supplied through lines 4B and 5B. The throughputs of methane and air are likewise reduced according to the quantity of water supplied.

An effluent is discharged from the second unit 1B through a line 6B and water is separated therefrom in a condenser 7B and conveyed into the third unit 1C through a line 3C by means of a pump 2C. The gaseous component from the effluent, in like manner as that originating from the first unit, is delivered via a line 8C and processed to synthesis gas and supplied to the ammonia synthesis plant (not shown).

The third unit 1C is formed analogously to the two previous units 1A, 1B except for the fact that the throughputs are reduced accordingly and the components are correspondingly smaller.

As indicated, the water most enriched with deuterium in the plant is introduced into a storage tank 9 and is supplied therefrom by means of a pump 10 into a plant (not shown) for the production of heavy water.

As required, a large number of units may be arranged in series, e.g. when a relatively small plant is to be used for the production of heavy water, having a correspondingly small throughput, with a water serving as the starting material which is still more enriched with deuterium.

In the following Table some calculated, determinative state variables are given in a numerical example for a process to be carried out in the plant shown.

The throughputs in kmol/h and the deuterium concentration (c) in ppm $$\left(\frac{D}{D+H}\right)$$

are given for the illustrated points $I_A-IV_A$, $I_B-IV_B$ and $I_C-IV_C$ and $V_C$ of the plant.

| | T (°C.) | P (bar) | THROUGHPUT OF HYDROGEN (kmol/h) | | | | DEUTERIUM CONCENTRATION IN ppm (D/D + H) | | | | $\alpha$ $H_2O/H_2$ |
|---|---|---|---|---|---|---|---|---|---|---|---|
| | | | $H_2$ | $H_2O$ Vapor | $H_2O$ Liquid | $CH_4$ | $H_2$ | $H_2O$ Vapor | $H_2O$ Liquid | $CH_4$ | |
| $I_A$ | 20 | 40 | — | — | 5039 | — | — | — | 146 | — | 1.84 |
| $II_A$ | 20 | 40 | — | — | — | 2215 | — | — | — | 146 | |
| $III_A$ | 400 | 32 | 4136 | 257 | 2861 | — | 107 | 197 | 197 | — | |
| $IV_A$ | 118 | 32 | 4136 | 257 | — | — | 107 | 197 | — | — | |
| $I_B$ | 118 | 40 | — | — | 2861 | — | — | — | 197 | — | 1.84 |
| $II_B$ | 20 | 40 | — | — | — | 1257 | — | — | — | 146 | |
| $III_B$ | 400 | 32 | 2348 | 146 | 1624 | — | 134 | 246 | 246 | — | |
| $IV_B$ | 118 | 32 | 2348 | 146 | — | — | 134 | 246 | — | — | |
| $I_C$ | 118 | 40 | — | — | 1624 | — | — | — | 246 | — | 1.84 |
| $II_C$ | 20 | 40 | — | — | — | 714 | — | — | — | 146 | |
| $III_C$ | 400 | 32 | 1333 | 83 | 922 | — | 158 | 291 | 291 | — | |
| $IV_C$ | 118 | 32 | 1333 | 83 | — | — | 158 | 291 | — | — | |
| $V_C$ | 118 | 32 | — | — | 922 | — | — | — | 291 | — | |

The quantity of synthesis gas obtained in the first unit 1A is sufficient for the production of 1125 tons per day (t/day) ammonia, the quantity of synthesis gas obtained in the second unit 1B is sufficient for the production of 639 t/day ammonia, and the quantity of synthesis gas obtained in the third unit 1C is sufficient for the production of 362 t/day ammonia, so that a total of 2126 tons of ammonia per day are produced in the ammonia synthesis plant (not shown).

The storage tank 9 is dimensioned to hold at least 132,806 cubic meters of enriched water. This corresponds to the required feed quantity for one year in a plant for the production of heavy water in which 32,198 kilograms of heavy water are produced per year.

What is claimed is:

1. A method for the preparation of deuterium-enriched water, said method comprising the steps of
supplying a carbonaceous feedstock selected from the group consisting of carbon and at least one hydrocarbon, and at least one of water and steam in excess to a first unit of a hydrogen production plant having at least two separating units for obtaining synthesis gas;
separating an effluent from the first unit into a gaseous component and a liquid component consisting of deuterium-enriched water;
isolating the liquid component;
introducing the deuterium-enriched water into a second unit of the plant;
contacting the deuterium-enriched water in the second unit with a smaller quantity of feedstock than in the first unit;
separating an effluent from the second unit into a liquid component consisting of deuterium-enriched water and a gaseous component; and
supplying the deuterium-enriched water from the second unit to a plant for production of heavy water.

2. A method as set forth in claim 1 wherein the liquid component from the second unit is stored for a given time in a storage tank prior to supply to a plant for production of heavy water.

3. A method of making deuterium-enriched water for the production of heavy water, said method comprising the steps of
introducing fresh water, a hydrocarbon, and air into a first hydrogen production unit of a synthesis gas plant to obtain a mixture consisting essentially of hydrogen, nitrogen, carbon dioxide and steam;
condensing said mixture to obtain a first amount of deuterium enriched water and a gaseous component;
separating the deuterium-enriched water;
introducing the deuterium-enriched water in an amount less than the fresh water into a second hydrogen production unit of the plant along with an amount of a hydrocarbon and air less than the amount of hydrocarbon and air introduced into the first unit to obtain a second mixture consisting essentially of hydrogen, nitrogen, carbon dioxide and steam;
condensing said second mixture to obtain a second amount of deuterium-enriched water of a higher deuterium content than said first amount and a second gaseous component; and
storing said second amount of deuterium-enriched water for subsequent use in a plant for the production of heavy water.

4. A method as set forth in claim 3 which further comprises the steps of separating carbon dioxide and the hydrocarbon from each of the gaseous components and supplying the remaining respective mixtures consisting essentially of hydrogen, nitrogen, carbon dioxide and traces of steam to an ammonia synthesis plant for the production of ammonia.

5. A method as set forth in claim 3 which further comprises the steps of introducing the second amount of deuterium-enriched water into a third hydrogen production unit of the plant along with an amount of hydrocarbon and air less than the amount of hydrocarbon and air introduced into the second unit to obtain a third mixture consisting essentially of hydrogen, nitrogen, carbon dioxide and steam;
condensing the third mixture to obtain a third amount of deuterium-enriched water of a higher deuterium content than said second amount; and
storing said third amount of deuterium-enriched water for subsequent use in a plant for the production of heavy water.

6. A method as set forth in claim 3 wherein each unit is a catalytic separating unit.

7. A method for the preparation of deuterium-enriched water, said method comprising the steps of supplying steam in excess and at least one hydrocarbon to a first unit of a hydrogen production plant having at least two hydrogen production units for obtaining synthesis gas;

separating an effluent from the first unit into a gaseous component and a liquid component consisting of deuterium-enriched water;

isolating the liquid component;

introducing the deuterium-enriched water into a second unit of the plant;

contacting the deuterium-enriched water in the second unit with a smaller quantity of hydrocarbon than in the first unit;

separating an effluent from the second unit into a liquid component consisting of deuterium-enriched water and a gaseous component; and supplying the deuterium-enriched water from the second unit to a plant for production of heavy water.

8. A method for the preparation of deuterium-enriched water, said method comprising the steps of supplying one of water and steam in excess and carbon to a first unit of a hydrogen production plant having at least two hydrogen production units for obtaining synthesis gas;

separating an effluent from the first unit into a gaseous component and a liquid component consisting of deuterium-enriched water;

isolating the liquid component;

introducing the deuterium-enriched water into a second unit of the plant;

contacting the deuterium-enriched water in the second unit with a smaller quantity of carbon than in the first unit;

separating an effluent from the second unit into a liquid component consisting of deuterium-enriched water and a gaseous component; and supplying the deuterium-enriched water from the second unit to a plant for production of heavy water.

* * * * *

UNITED STATES PATENT AND TRADEMARK OFFICE
CERTIFICATE OF CORRECTION

PATENT NO. : 4,414,195
DATED : November 8, 1983
INVENTOR(S) : CHARLES MANDRIN

It is certified that error appears in the above—identified patent and that said Letters Patent is hereby corrected as shown below:

Column 5, in the chart under column $H_2O/H_2$, "1.84" should coincide with points $III_A$, $III_B$ and $III_C$ and not points $I_A$, $I_B$ and $I_C$ Signed and Sealed this Seventh Day of February 1984

[SEAL]

Attest:

GERALD J. MOSSINGHOFF

Attesting Officer

Commissioner of Patents and Trademarks